United States Patent Office 3,389,122
Patented June 18, 1968

3,389,122
NOVEL POLYAMIDES AND HETEROCYCLIC POLYMERS PREPARED FROM AROMATIC HYDRAZIDES AND DICARBOXYLIC ACID DICHLORIDES
Billy M. Culbertson, Burnsville, Minn., assignor to Ashland Oil & Refining Company, Ashland, Ky., a corporation of Kentucky
No Drawing. Continuation-in-part of application Ser. No. 493,544, Oct. 6, 1965. This application May 18, 1966, Ser. No. 550,924
16 Claims. (Cl. 260—47)

ABSTRACT OF THE DISCLOSURE

Novel polymeric materials useful in the formation of films and fibers are prepared by a process which comprises reacting a solution of a dicarboxylic acid dichloride in an inert organic polar solvent with a solution of an aromatic hydrazide having the general formula (III)
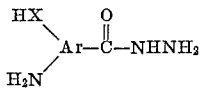

wherein Ar is a trivalent aromatic radical containing at least one ring of six carbon atoms, said ring being characterized by benzenoid unsaturation, wherein said valences are at separate aromatic ring carbon atoms, two of said aromatic ring carbon atoms, attached to the nitrogen and the X group, being adjacent to each other and wherein X is a radical selected from the group consisting of oxygen, sulfur and —N(R')— (where R' is hydrogen, alkyl, aryl, or combinations of aryl and alkyl); said aromatic hydrazide being dissolved in said organic polar solvent, and recovering a polymer having recurring units of the following structural formula (I)
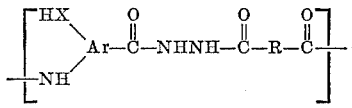

wherein R is the carboxylic acid group-free remainder of said dicarboxylic acid dichloride. On heating to temperatures above 200° C. these polymers cyclodehydrate to form polymers having recurring units of the following structural formula

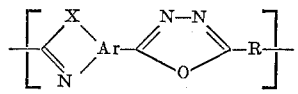

The present invention relates to novel polymeric materials containing benzimidazole, benzoxazole or benzothiazole and oxadiazole moieties in the repeating unit of the polymer chain, to novel polymeric precursors thereof and to methods for the preparation of such polymers.

This application is a continuation in part of my copending application Ser. No. 493,544, filed Oct. 6, 1965.

The precursors of the heterocyclic aromatic polymers of the present invention are polyamides having recurring units of the following structural formula (I)
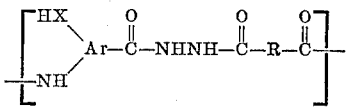

which on cyclodehydration can be converted to units having the structural formula (II)
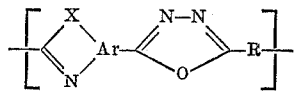

wherein Ar is a trivalent aromatic radical (preferably having 6 to 13 carbon atoms) containing at least one ring of six carbon atoms, said ring being characterized by benzenoid unsaturation, said valences being at separate aromatic ring carbon atoms, two of said aromatic ring carbon atoms, attached to the nitrogen group and the X group, being adjacent (i.e., ortho) to each other; X is oxygen, sulfur or —N(R')— (where R' is hydrogen, alkyl, aryl, or combinations of alkyl and aryl such as alkaryl and aralkyl, where said alkyl, aryl and combinations thereof preferably have 1 to 10 carbon atoms); and R is the carboxylic acid group-free remainder of an aliphatic, aromatic, or N—, O—, or S— heterocyclic dicarboxylic acid. In a preferred embodiment of the present invention, Ar is a trivalent (a,b,c) aromatic radical having one of the following formulas

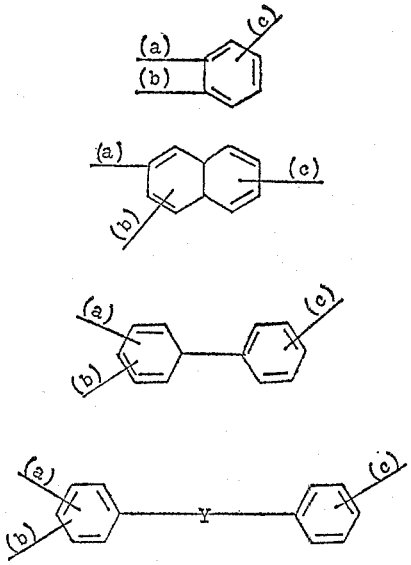

and wherein valences (a) and (b) are attached to the nitrogen and X groups on adjacent carbon atoms and Y is an alkylene radical of 1 to 3 carbon atoms, —CO—, —O—, —S—, —NH—, or —SO₂—. In a preferred embodiment of the present invention, R has 1 to 14 carbon atoms and is a divalent aromatic radical (which can contain heterocyclic groups, an aliphatic hydrocarbon radical or a cycloaliphatic hydrocarbon radical).

The aromatic polymers of the present invention are obtained by reacting at least one aromatic hydrazide having the general formula (III)
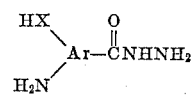

wherein X and Ar have the above-identified meaning with at least one dicarboxylic acid compound, such as dibasic acid, dibasic acid anhydride, dibasic acid diester or a dibasic acid dichloride, which is capable of reacting with amino groups at the polymerization conditions. The aromatic hydrazide and the dicarboxylic acid compound can be reacted directly, i.e., in bulk, or in solution, at elevated temperatures to result in the formation of heterocyclic polymer of Formula II. However, in the preferred method the aromatic hydrazide is reacted with a dicarboxylic acid dichloride at low temperatures to form the polyamide having repeating units illustrated by Formula I. The polyamide is then cyclodehydrated to the heterocyclic polymer of Formula II by heating. This two-step method of forming the heterocyclic polymers is preferred since the polyamide having repeating units of Formula I is better suited, as compared to the heterocyclic polymer, for fabrication into the desired shape, such as a film, a fiber, a coating, or a laminate because of its greater solubility and better rheological properties. It is to be understood, however, that it is not essential for the precursor polymer to consist entirely of repeating amide units, and that the polymer can contain a significant number of repeating units, up to 50%, which contain the heterocyclic structure. The solubility and fabricability of the aromatic polymers of the present invention further depends on the structure of the dicarboxylic acid compound. Thus, the reaction of the aromatic hydrazide with dicarboxylic acid compounds results in hetero-ring-containing polymers of high interactability while the reaction of the aromatic hydrazide with aliphatic dicarboxylic acid compounds results in polymers which dissolve more readily and can be more readily fabricated into useful articles. In the latter instance, bulk polymerization can give rise to polymers of acceptable fabricability.

The polymerization of the dicarboxylic acid dichloride with the aromatic hydrazide to the polyamide can be carried out by solution polymerization techniques or by interface polymerization techniques. In the solution polymerization technique the monomers are dissolved in suitable solvents employing the same or miscible solvents. On admixing the monomer solutions a polymer solution is obtained which can be directly cast into films or spun into fibers. The solvent or solvents are employed in sufficient amounts to maintain the polymer in solution and to result in a solution which has a viscosity and polymer content suitable for the intended application of the polymer. Additional solvent can, of course, be added or solvent removed to meet the specifications for the intended utility of the solution. In the interface polymerization, one of the monomers, preferably the dicarboxylic acid dichloride, is dissolved in an organic solvent which is a non-solvent for the polymer and the aromatic hydrazide. The aromatic hydrazide, in the form of the hydrochloride, is dispersed in an aqueous phase with the aid of a suitable emulsifier and a proton acceptor is added in sufficient quantity to neutralize the acid released during the polymerization. Suitable proton acceptors include sodium carbonate, magnesium carbonate, calcium carbonate and tertiary amines such as triethylamine, trimethylamine and pyridine. The two phases are then combined and the polymer is formed at the interface of the organic and the aqueous solvents. Depending on the manner in which the interface polymerization is conducted, films and fibers can be directly formed at the interface or if the two solvents are agitated into a mixture, the polymer can be obtained in particulate form.

Both the solution polymerization and the interface polymerization are preferably conducted at low temperatures, i.e. temperatures of −30° to 50° C., although higher temperatures are feasible. Elevated temperatures are not preferred, generally, since the polymerization is rapid even at the lowest temperatures and since better control over the polymerization is achieved in the indicated range. Furthermore, increasing reaction temperatures above 100° C. result in increasingly higher degrees of cyclodehydration and heterocyclic ring formation in the polymer chain.

The aromatic hydrazide and dibasic acid compounds are preferably employed in equimolar quantities or as close as possible thereto since such ratios result in the highest molecular weights. The molecular weight of the polymer decreases as the ratio of monomers is either lowered or increased. The monomer ratio therefore provides an excellent means for controlling the molecular weight of the resulting polymer. Although it is generally preferred to polymerize the monomers to the highest possible molecular weight since such results in the best mechanical properties, there may be applications such as in coatings which do not require the optimum mechanical properties but are concerned with the solubility of the polymer and the viscosity of the polymer solution. In such applications the molecular weight of the polymer need not be of the highest possible order. In general the polyamide need not have a molecular weight higher than necessary for fabrication into the desired shape. The conversion to the heterocyclic polymer results in outstanding physical properties such as enhanced rigidity, due to the plurality of highly stable, rigid heterocyclic rings present in the polymer. The molecular weight of the polyamide as measured by inherent viscosity employing a 0.5 g. solution of the polymer in 100 ml. of dimethyl sulfoxide at 25° C. is generally at least 0.1 and preferably 0.3 to 5.

The reaction time can be varied widely, although it is generally preferred to allow the polymerization to go to completion. When substantially equimolar concentrations of monomer are employed, a substantially quantitative yield of polymer is obtained. The polymerization is generally carried out at atmospheric pressure. Pressure itself has no effect on the polymerization itself and, thus, superatmospheric pressure or subatmospheric pressure can be employed if desirable in the contemplated polymerization process.

The resulting polymeric material containing repeated units of Formula I is cyclodehydrated to the polymer containing the heterocyclic units of Formula II by heating to temperatures above 150° C., and, preferably, within the range of 250 to 350° C., although such is not critical. Cyclodehydration can be accelerated by the use of chemical dehydration agents such as anhydrides of monocarboxylic acids. As indicated above, the cyclodehydration is preferably carried out after the polyamide has been shaped into the desired article in view of the better processing properties of the polyamide as compared to the heterocyclic polymer. The conversion of the polyamide to heterocyclic polymer can be followed by various analytical methods such as infrared spectroscopy and differential thermal analysis. These methods show that all of the amide and the hydrazide groups can be converted to either the benzoxazole, benzimidazole or benzothiazole ring or respectively to the oxadiazole ring.

The aromatic hydrazides employed in the formation of the novel aromatic polymers of the present invention have the general formula (III) 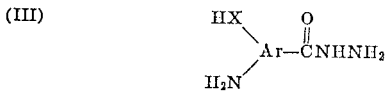

wherein X and Ar are as described hereinabove. The aromatic hydrazides preferred in the formation of the polymers of the present invention have the following formulas

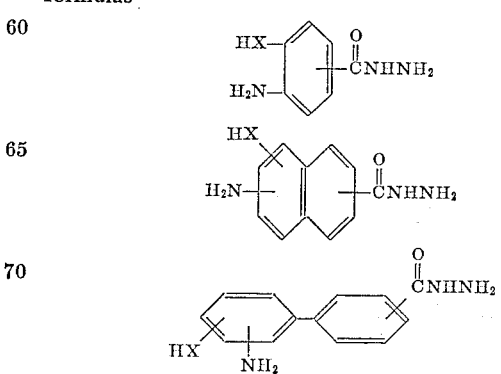

and

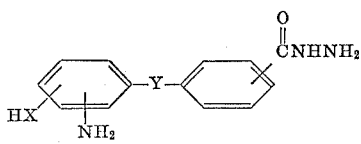

where X and Y are defined above. Examples of suitable aromatic hydrazides include 4-amino-3-hydroxy-benzoyl hydrazide, 3-amino-4-hydroxy-benzoyl hydrazide, 3,4-diamino-benzoyl-hydrazide, 4-mercapto-3-amino-benzoyl hydrazide, 3-mercapto-4-aminobenzoyl hydrazide, 1-amino-2-hydroxy-7-carboxyl-naphthalene hydrazide, 1-hydroxy-2-amino-6-carboxyl-naphthalene hydrazide, 1,2-diamino-7-carboxyl-naphthalene hydrazide, 2,3-diamino-4'-carboxyl-diphenyl hydrazide, 2-hydroxy-3-amino-2'-carboxyl-biphenyl hydrazide, 3-amino-4(N-methyl)amino-benzoyl hydrazide, 3-amino-4(N-tertiary-butyl)amino-benzoyl hydrazide, 3-amino-4(N-phenyl)aminobenzoyl hydrazide, 3-amino-4(N-naphthyl)amino-benzoyl hydrazide, 2-amino-3-hydroxy-3'-carboxy-diphenyl ether hydrazide, 2,3-diamino-4'-carboxy-diphenyl ether hydrazide, and 2-hydroxy-3-amino-4'-carboxy-diphenyl sulfide hydrazide. The most preferred hydrazides are those containing a simple benzene ring and particularly those having a hydroxy and an amino substituent.

The aromatic hydrazides employed in the formation of the heterocyclic polymers of the present invention are prepared by various reactions from available starting materials. Such starting materials contain one or more of the substituents or precursors thereof of the aromatic hydrazide. The remaining functional groups are then introduced by known reactions. As a rule it is preferred to form the hydrazide substituent in the final synthesis step. Thus, 3-amino-4-hydroxy-benzoyl hydrazide can be prepared from phenol by reacting the phenol with carbon dioxide in alkaline media to obtain the carboxyl substituted phenol which on acidification forms p-hydroxy-benzoic acid. The acid is treated with $HNO_3$ to form the 3-nitro-4-hydroxy-benzoic acid which is esterified with methanol. The methyl ester is hydrogenated using a platinum catalyst to transform the nitro group into an amino group. The ester is then reacted with hydrazine to result in the desired hydrazide. Similar synthesis methods can be employed with other starting materials. Other synthesis methods resulting in suitable aromatic hydrazides will be apparent to those skilled in the art.

The dicarboxylic acid component employed in the formation of the novel polymers of the present invention can be in the form of a dicarboxylic acid, the anhydride of a dicarboxylic acid, the diester of a dicarboxylic acid such as the lower alkyl esters but, as indicated hereinabove, is preferably employed in the form of the acid dichloride. In general, any dicarboxylic acid compound which is capable of reacting with an amino group at the polymerization conditions can be employed. Such dicarboxylic acids are well known from polyamide and polyester condensations. The preferred dicarboxylic acids are aliphatic, cycloaliphatic, aromatic and heterocyclic aromatic acids. Suitable acids, useful in the preparation of the novel polymers of the present invention in the form of the dichloride, include oxalic acid, malonic acid, adipic acid, succinic acid, glutaric acid, pimelic acid, suberic acid, azelaic acid, sebacic acid, brassylic acid, maleic acid, $\alpha,\beta$-diethyl succinic acid, phthalic acid, isophthalic acid, terephthalic acid, 1,2-cyclohexanedicarboxylic acid, 1,4-cyclohexanedicarboxylic acid, 1,2-cyclobutenedicarboxylic acid, 3,6-methylene-4-cyclohexane-1,2-dicarboxylic acid, 3,5-pyridine dicarboxylic acid, 4,4-diphenylether dicarboxylic acid, and naphthalic acid.

The solvents employed in the solution polymerization to form the precursor polyamide are polar organic solvents whose functional groups do not react with either of the reactants to any appreciable extent. Besides being inert to the system, the solvent must be capable of dissolving the polymer and at least one of the reactants but preferably both reactants. Preferred solvents are those which are also acid acceptors. Solvents which meet all of these specifications include the normally liquid N-alkyl-2-pyrrolidones and N,N-dialkylcarboxyl amides. Specific examples of these solvents are N-methyl-2-pyrrolidone, N,N-dimethylformamide, N,N-dimethylacetamide, N,N-diethylformamide and N,N-diethylacetamide. Other solvents which can be employed include dimethyl sulfoxide, tetramethyl urea, pyridine, dimethyl sulfone, tetramethyl sulfone, formamide and N-methylformamide.

The polyamides of the present invention can be employed as such in the manufacture of fibers and films, or as laminating and coating resins, but are preferably converted to the heterocyclic polymer in view of the superior physical properties inherent in the latter type of polymer, particularly in respect to mechanical properties and thermal stability. The polyamides can also be reacted with cross-linking agents to result in structures other than the heterocyclic polymer on heating. Although superior mechanical properties are exhibited by the heterocyclic polymers derived from aliphatic dicarboxylic acid compounds, the heterocyclic polymers obtained from aromatic acid compounds have not only superior mechanical properties but, in addition, possess a thermal stability which is unique in that the polymers can be exposed to temperatures as high as 500° C. without decomposition. The heterocyclic polymers derived from aromatic hydrazides and aromatic acid compounds, therefore, constitute the preferred polymers of the present invention.

The formation of the polymers of the present invention is further illustrated by the following examples in which all units of quantity are by weight unless otherwise specified.

Example 1

A three-necked, round-bottomed flask was fitted with a nitrogen ebullator tube, magnetic stirrer bar, calcium chloride tube, and thermometer. After flushing the flask with nitrogen for 15 minutes, the flask was charged with 16.7 parts of 3-hydroxy-4-amino-benzoyl hydrazide and about 200 parts of N-methyl-2-pyrrolidone (purified by distillation from phosphorus pentoxide). The mixture was agitated until the monomer had dissolved. The solution was cooled to 0° C. in an ice bath and 20.3 parts of solid terephthaloyl dichloride and about 100 parts of N-methyl-2-pyrrolidone were added. The temperature of the reaction mixture increased to 25° C. and the solution became very viscous. Agitation of the mixture at room temperature was continued for an additional 90 minutes. A portion of the solution was used to cast free films on glass plates. The films obtained by drying the coated glass plates in a vacuum oven at 75° C. and 5 mm. Hg pressure for two hours had excellent color, flexibility, tensile strength and crease resistance.

The remainder of the solution was poured with high speed agitation into approximately 5000 parts of water. The precipitate was isolated by filtration, suspended in boiling absolute ethanol, collected by suction filtration and dried in a vacuum at 138° C., 0.05 mm. Hg pressure, for four hours. The polymer was found to have an inherent viscosity of 2.12 as measured by an 0.5 g. solution in 100 ml. of dimethyl sulfoxide at 25° C. The polyamide structure of the product was confirmed by infrared-(IR), differential thermal-(DTA), and thermogravimetric analysis (TGA).

The polyamide was heated to 300° C. for one hour and converted to a polymer having recurring units of the following structure.

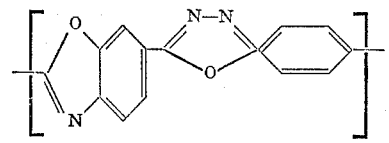

The structure of the poly[2-(1,4-phenylene)-6-(1,3,4-oxadiazolyl) benzoxazole] was confirmed by IR, DTA and TGA analyses. The heterocyclic polymer exhibited thermal stability at temperatures above 500° C. The same polymer structure is obtained when films of the polyamide are cured by heating to 300° C. for one hour.

Example 2

The procedure of Example 1 was repeated employing 3-amino-4-hydroxy-benzoyl hydrazide and terephthaloyl dichloride. A quantitative yield of the polyamide was obtained. The polyamide was found to have an inherent viscosity of 0.90. On heating in vacuum, poly[2-(1,4-phenylene)-5-(1,3,4-oxadiazolyl) benzoxazole] was obtained having substantially the same properties as the polybenzoxazole of Example 1.

Example 3

The procedure of Example 1 was repeated employing isophthaloyl dichloride. The corresponding polyamide was obtained and was converted to poly[2-(1,3-phenylene)-6-(1,3,4-oxadiazolyl) benzoxazole].

Example 4

Employing the procedure of Example 1, 16.7 parts of 4-amino-3-hydroxyl-benzoyl hydrazide was reacted with 23.8 parts of sebacyl dichloride. The polyamide isolated has an inherent viscosity of 0.96 and can be cast into films of superior mechanical properties. The polyamide solution can be spun directly into strong fibers. On heating to 300° C. for a period of one hour, the polyamide was converted to poly[2 - octamethylene - 6 - (1,3,4-oxadiazolyl) benzoxazole].

Example 5

Employing the procedure of Example 1, poly[2-(1,4-phenylene)-6-(1,3,4-oxadiazolyl) benzothiazole] was obtained from 4-amino-3-mercapto-benzoyl hydrazide and terephthaloyl dichloride.

Example 6

3-amino-4(N-phenyl)amino-benzoyl hydrazide was prepared by reacting 3-nitro-4-chlorobenzoic acid with aniline, isolating the resulting acid and esterifying it with ethyl alcohol, reducing the nitro groups with the resulting compound and then treating the resultant ethyl 3-amino-4(N-phenyl)aminobenzoate with hydrazine.

Employing the procedure of Example 1, 19.36 parts of 3-amino-4(N - phenyl)amino - benzoyl hydrazide was reacted with 16.24 parts of terephthaloyl chloride in 350 parts of N-methylpyrrolidone. A quantitative yield of the polyamide was obtained. The polyamide was found to have an inherent viscosity of 0.85. The polyamide solution can be used directly to spin strong fibers or cast strong films. On heating, as per Example 1, poly 2-(1,4-phenylene)-5-(1,3,4-oxadiazolyl) - N(phenyl)benzimidazole was obtained having substantially the same properties as the polybenzoxazole of Example 1.

The foregoing examples have illustrated the formation of the novel polyamides and the novel heterocyclic polymers derived from the polyamides of the present invention. It will be apparent from these examples that formation of the polymer occurs readily on admixing solutions of the comonomers at low temperatures. The cyclodehydration is achieved by heating the polymer to temperatures above 200° C. It will, therefore, be apparent that the formation of the novel polyamides and heterocyclic polymers of the present invention not specifically illustrated in the foregoing examples can be similarly accomplished using the described polymerization techniques.

What is claimed is:

1. A novel resinous polyamide consisting essentially of recurring units of the following structural formula (I) 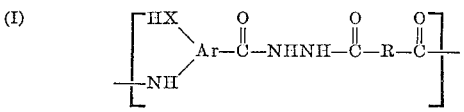

wherein Ar is a trivalent aromatic radical containing at least one ring of six carbon atoms, said ring being characterized by benzenoid unsaturation, said valences being at separate aromatic ring carbon atoms, two of said aromatic ring carbon atoms, attached to the nitrogen and the X group, being adjacent to each other; X is a radical selected from the group consisting of oxygen, sulfur and —N(R')—, where R' is hydrogen, alkyl or aryl; and R is the carboxylic acid group-free remainder of a dicarboxylic acid.

2. The resinous oxadiazole polymer derived from the polyamide of claim 1 consisting essentially of recurring units of the following structural formula

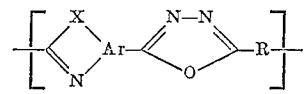

wherein X, Ar and R have the meaning defined in claim 1.

3. A novel resinous heterocyclic polymer consisting essentially of recurring units of the following structural formula (II) 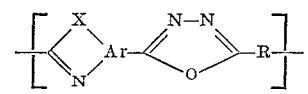

wherein Ar is an aromatic radical selected from the class consisting of trivalent (a, b, c) radicals having the formulas

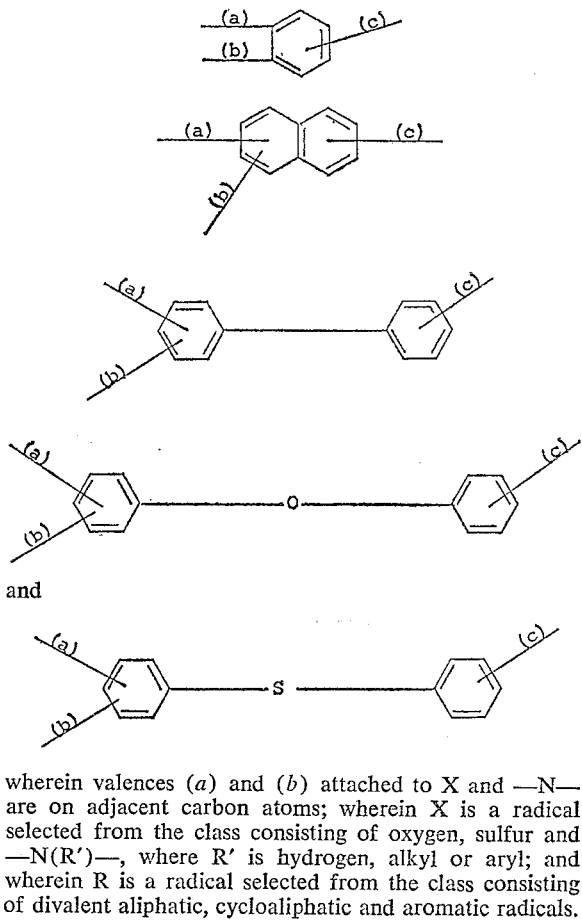

wherein valences (a) and (b) attached to X and —N— are on adjacent carbon atoms; wherein X is a radical selected from the class consisting of oxygen, sulfur and —N(R')—, where R' is hydrogen, alkyl or aryl; and wherein R is a radical selected from the class consisting of divalent aliphatic, cycloaliphatic and aromatic radicals.

4. The novel resinous heterocyclic polymer of claim 3 wherein X is oxygen.

5. The novel resinous heterocyclic polymer of claim 3 wherein Ar is a trivalent benzene radical.

6. The novel resinous heterocyclic polymer of claim 3 wherein R is a divalent benzene radical.

7. The novel resinous heterocyclic polymer of claim 3 consisting essentially of recurring units of the following structural formula

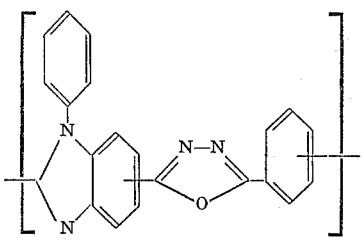

8. The novel resinous heterocyclic polymer of claim 3 consisting essentially of recurring units of the following structural formula

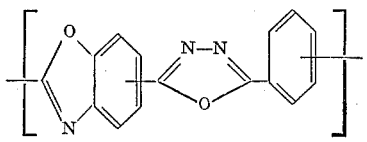

9. The novel resinous heterocyclic polymer of claim 3 consisting essentially of recurring units of the following structural formula

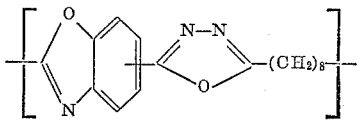

10. The process of preparing novel resinous polymeric materials which comprises reacting at a temperature of about −30° C. to about 100° C. a solution of a dicarboxylic acid dichloride in an inert organic polar solvent with a solution of an aromatic hydrazide having the general formula (III)

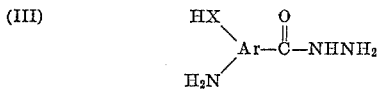

wherein Ar is a trivalent aromatic radical containing at least one ring of six carbon atoms, said ring being characterized by benzenoid unsaturation, wherein said valences are at separate aromatic ring carbon atoms, two of said aromatic ring carbon atoms, attached to the nitrogen and the X group, being adjacent to each other; and wherein X is a radical selected from the group consisting of oxygen, sulfur and —N(R′)—, where R′ is hydrogen, alkyl, or aryl; said aromatic hydrazide being dissolved in said organic polar solvent, and recovering a polymer consisting essentially of recurring units of the following structural formula (I)

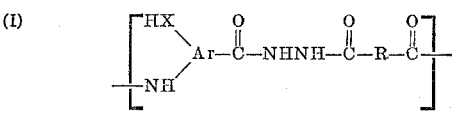

wherein R is the carboxylic acid group-free remainder of said dicarboxylic acid dichloride.

11. The process of claim 10 wherein said polymeric material is heated to temperatures above 200° C. to cyclodehydrate the polymer.

12. The process of preparing novel resinous polymeric materials which comprises reacting at a temperature above 150° C. a dicarboxylic acid compound capable of reacting with two amino groups with an aromatic hydrazide having the general formula (III)

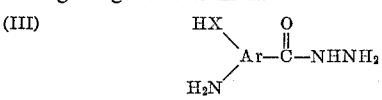

wherein Ar is a trivalent aromatic radical containing at least one ring of six carbon atoms, said ring being characterized by benzenoid unsaturation, wherein said valences are at separate aromatic ring carbon atoms, two of said aromatic ring carbon atoms, attached to the nitrogen and the X group, being adjacent to each other; and wherein X is a radical selected from the group consisting of oxygen, sulfur and —N(R′)—, where R′ is hydrogen, alkyl, or aryl; and recovering a polymer consisting essentially of recurring units of the following structural formula (II)

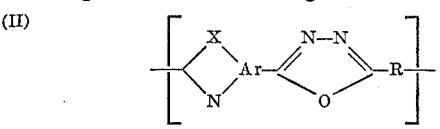

wherein R is the carboxylic acid group-free remainder of said dicarboxylic acid compound.

13. The process of claim 12 wherein X is oxygen.

14. The process of claim 12 wherein X is oxygen, Ar is a trivalent benzene radical and R is a divalent benzene radical.

15. The product of claim 2 in the form of a self-supporting film.

16. The product of claim 2 in the form of a fiber.

References Cited

UNITED STATES PATENTS 3,130,182    4/1964    Frazer _____ 260—78

OTHER REFERENCES

Journal of Polymer Science, Preparation of Fully Aromatic Polybenzoxazoles, Kubota et al., vol. 2, pp. 655–659 (1964).

WILLIAM H. SHORT, *Primary Examiner.*

LOUISE P. QUAST, *Examiner.*

L. LEE, *Assistant Examiner.*